United States Patent [19]

Brower et al.

[11] 4,419,705

[45] Dec. 6, 1983

[54] FERRITE BEVELED CORE FOR MAGNETIC HEAD

[75] Inventors: Ralph D. Brower; Paul D. Losee, both of Layton, Utah

[73] Assignee: Iomega Corporation, Ogden, Utah

[21] Appl. No.: 259,706

[22] Filed: May 1, 1981

[51] Int. Cl.³ .............................................. G11B 5/60
[52] U.S. Cl. ................................................... 360/103
[58] Field of Search ............................. 360/125–128, 360/122–123, 102, 103, 105, 110–112

[56] References Cited

U.S. PATENT DOCUMENTS

| | | | |
|---|---|---|---|
| 3,553,389 | 1/1971 | Barger | 360/123 X |
| 3,610,837 | 10/1971 | Brede et al. | 179/100.2 C |
| 3,813,766 | 6/1974 | Brock et al. | 360/123 X |
| 3,823,416 | 7/1974 | Warner | 360/122 |
| 3,961,372 | 6/1976 | Brock et al. | 360/102 |
| 4,293,883 | 10/1981 | Cox et al. | 360/129 X |
| 4,298,899 | 11/1981 | Argumedo et al. | 360/103 X |
| 4,316,228 | 2/1982 | Fujiwara et al. | 360/127 |

FOREIGN PATENT DOCUMENTS 55-25823  2/1980  Japan .................................. 360/103

*Primary Examiner*—Alfred H. Eddleman
*Assistant Examiner*—K. Wong
*Attorney, Agent, or Firm*—Woodcock, Washburn, Kurtz, Mackiewicz & Norris

[57] ABSTRACT

A core for a magnetic head assembly includes a T-shaped ferrite member having an aperture for the transducing coil and a beveled edge along the top of the T. A ceramic body has a first slot in which the arms of the T-shaped member are positioned and a cross-slot which is deeper than the first slot. The vertical portion of the T-shaped ferrite core is positioned in the cross-slot.

9 Claims, 5 Drawing Figures

FERRITE BEVELED CORE FOR MAGNETIC HEAD

BACKGROUND OF THE INVENTION

This invention relates to flying magnetic head assemblies, and more particularly, to such an assembly which includes a ferrite core mounted in a slider body which, with an edge of the core, forms longitudinal slots with the magnetic core constituting the center rail.

Magnetic recording systems utilizing transducers that fly on an air-bearing film over a magnetic recording disk surface have been extensively utilized. Decreasing the spacing between the transducer gap and the medium enhances system performance. U.S. Pat. Nos. 3,823,416 and 3,961,372 show magnetic head assemblies in which the ferrite core is aligned with the center rail and the slider forms two outlying rails in a three rail magnetic head assembly. IBM Technical Disclosure Bulletin, Vo. XX, No. 1, June, 1977, shows a five rail or "penta" rail, magnetic head assembly. Magnetic head assemblies of this type are used in magnetic disk drives which use the so-called "Winchester" type of head. These disk drives are high performance, high density disk drives.

"Floppy" disk drives provide lower performance at a much reduced data density on the disk. U.S. Pat. No. 3,610,837 shows a magnetic head assembly similar to those used in IBM floppy disk drives. While this patent shows a substantially rectangular head assembly, these assemblies are formed into circular "buttons" in actual use.

One of the problems encountered in these magnetic head assemblies is how to increase the output voltage while maintaining the small size which is necessary for high density operation.

The output voltage is directly related to the core efficiency which is related to the reluctance of the gap and the reluctance of the rest of the core as follows:

$$n = R_g/R_t$$

where n is the efficiency, $R_g$ is the reluctance of the gap, and $R_t$ is the reluctance of the rest of the core. Reluctance is inversely proportional to the cross-sectional area of the core. In order to decrease total reluctance, with a consequent increase in efficiency and output voltage, it is desirable to increase the cross-sectional area. However, the thickness of the core is dictated by magnetic track width and must be extremely thin. The cross-sectional area can be increased only by increasing core length. However, as core length increases, the reluctance mean path is also increased so that total reluctance remains virtually unchanged. In a conventional magnetic core where the thickness is fixed it is very difficult to increase the output voltage by changing the reluctance path.

It is an object of the present invention to provide a core for a magnetic head assembly having increased efficiency and output voltage.

Attempts have been made to shorten the length of the magnetic core. The problem of handling and mounting such short length cores is solved by bonding ceramic members to the ends thereof. However, this places glass bonds on the recording head surfaces. These glass bonds often deteriorate and result in glass particles damaging the recording surface.

It is another object of the present invention to provide a high output magnetic head core without objectionable glass bonds near the magnetic gap.

Another consideration is ease of manufacture of magnetic head assemblies. Core breakage and assembly time are significant.

It is another object of the present invention to provide a magnetic core assembly having better accuracy in core location, minimized core edge wear, reduced core breakage, and assembly time.

RELATED APPLICATIONS

Copending application Ser. No. 259,698, filed May 1, 1981, Losee and Norton, shows and claims the coupler for the magnetic head of this invention.

SUMMARY OF THE INVENTION

In accordance with the present invention, a magnetic head assembly has a T-shaped ferrite core. Beveled edges along the top of the T form the recording surface. The "T-shape" and the beveled edges increase the efficiency, and hence the output, of the core.

Further in accordance with the present invention, the assembly includes a ceramic body having a cross-slot which allows for the exposure of the aperture for the purpose of the coil winding. A cap is affixed to the ceramic body. The cap material is selected to provide the required mechanical characteristics imposed by the tribological requirements. This assembly has a slot in which the arms of the T-shaped core are disposed. This slot is perpendicular to the cross-slot and to a depth which allows the placement of the transducer relative to the surface of the cap. The cross-slot and an aperture in the core provide a path for winding a coil on the assembly. Because of the T-shape of the core, the slot in which the arms of the T are disposed is not as deep as it would otherwise be. Because of this, the sides of the slots are less tapered than would be the case in a deeper slot. Because of this, the core is more accurately located in the slot.

In accordance with another aspect of the invention, improved manufacturing yield results from the beveled edge on the core. The beveled corners provide greater support at the edge that defines the magnetic track width, thereby minimizing edge chipping and edge wear which reduce the effect of track width and cause interchangeability problems. Conventional straight sided cores are ground to a specified thickness which defines the track width. If left exposed, these edges are very vulnerable to chipping and wear during manufacture and during normal service. The beveled edges of the core made in accordance with this invention provide greater material support which minimizes these problems. Furthermore, the beveled edges provide air slots on both sides or the recording surface which form the center rail in the magnetic head assembly. Because of this, a penta rail head is obtained without the necessity of an extra slotting operation.

In accordance with another aspect of the invention, the magnetic head assembly is easily formed into a circular button which provides high performance penta rail operation.

The foregoing and other objects, features and advantages of the invention will be better understood from the following more detailed description and appended claims.

SHORT DESCRIPTION OF THE DRAWINGS

FIG. 3 shows the mean reluctance path for a prior art rectangular core;

FIG. 5 shows the magnetic head assembly of the present invention formed into a circular button.

DESCRIPTION OF THE PREFERRED EMBODIMENT

Figure 1:
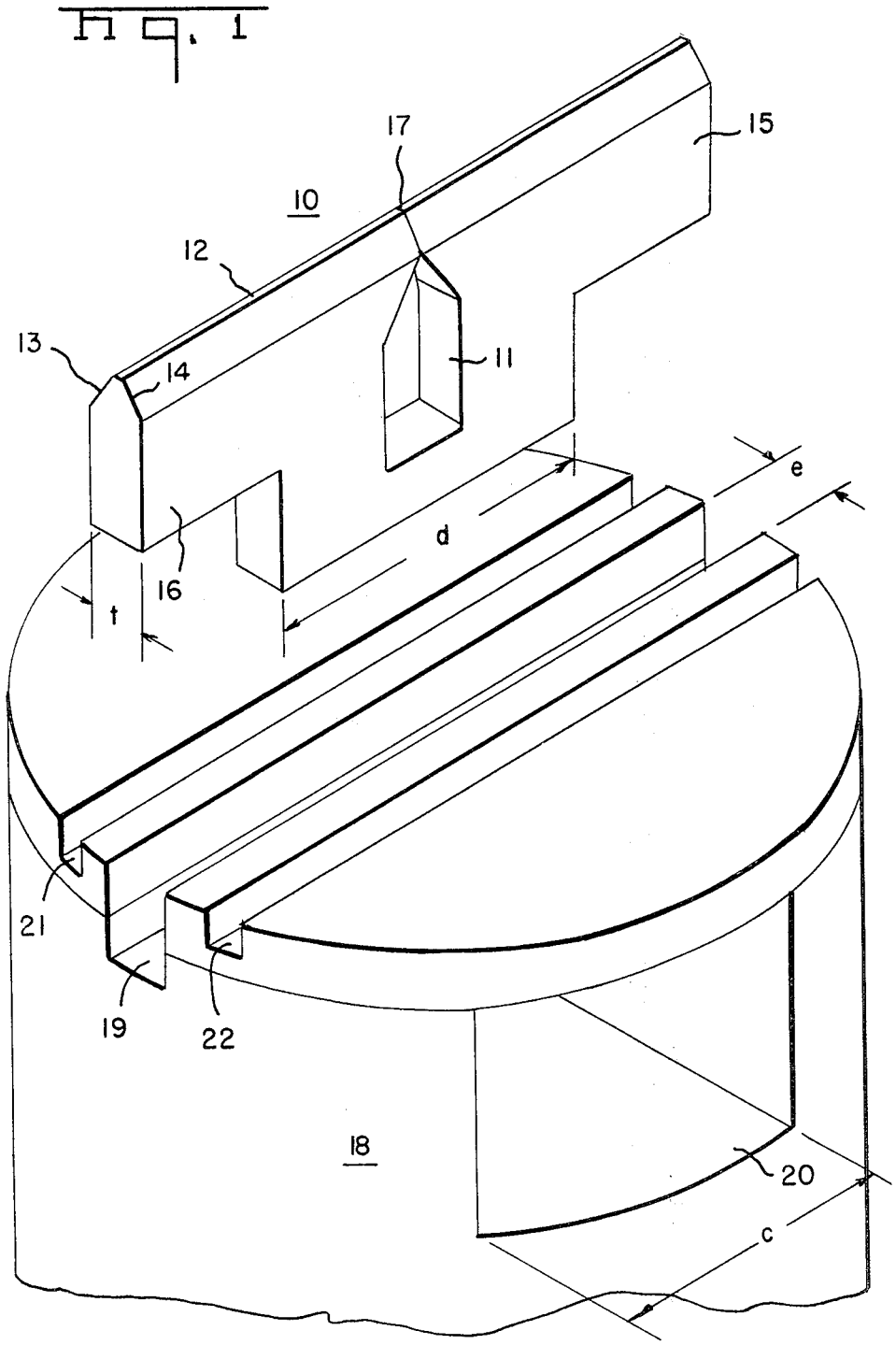
FIG. 1 shows the core and body of the magnetic head assembly of the present invention.

Referring to FIG. 1, the T-shaped ferrite member 10 has an aperture 11 through which a transducing coil is wound. The surface 12 is disposed adjacent to the magnetic recording medium. The width of the surface 12 approximates the width of the magnetic recording track. The core has beveled edges 13 and 14.

The core is formed of two pieces 15 and 16 which abut along the vertical of the T. The abutment of the pieces across the beveled edges forms the magnetic gap 17.

The ceramic body 18 has a slot 19 in which the arms of the T-shaped core 10 are positioned. A cross slot 20 is deeper than the slot 19. The vertical portion of the T-shaped core 10 is positioned in the slot 20. The slot 20 and the aperture 11 provide a path for winding a coil on the assembly.

Third and fourth slots 21 and 22 are parallel to and on opposite sides of the slot 19. These slots, together with the slots formed by the beveled edges 13 and 14, form a penta rail surface.

Figure 2:
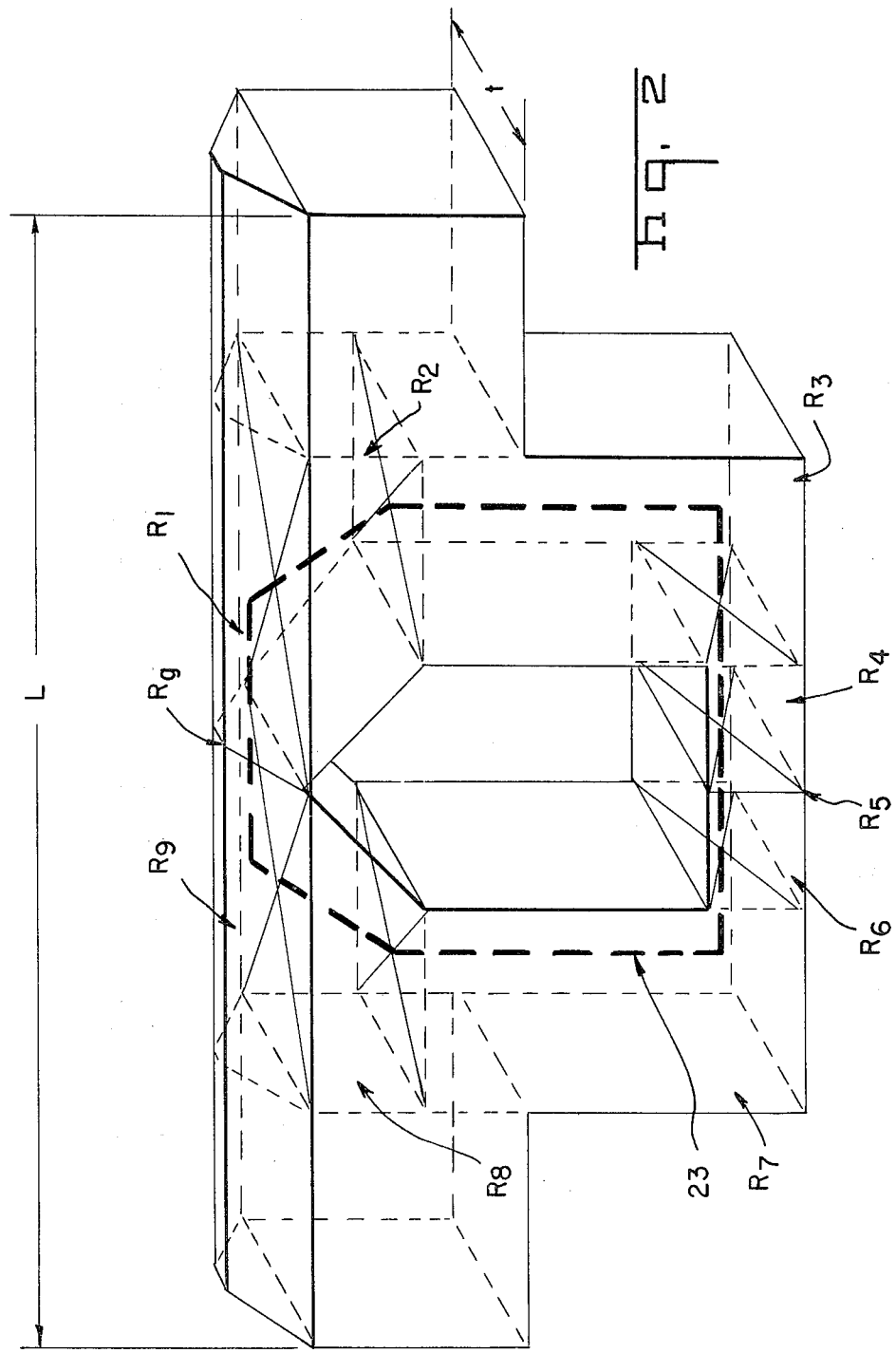
FIG. 2 shows the mean length of the reluctance path of the T-shaped core of the present invention.
Figure 7:
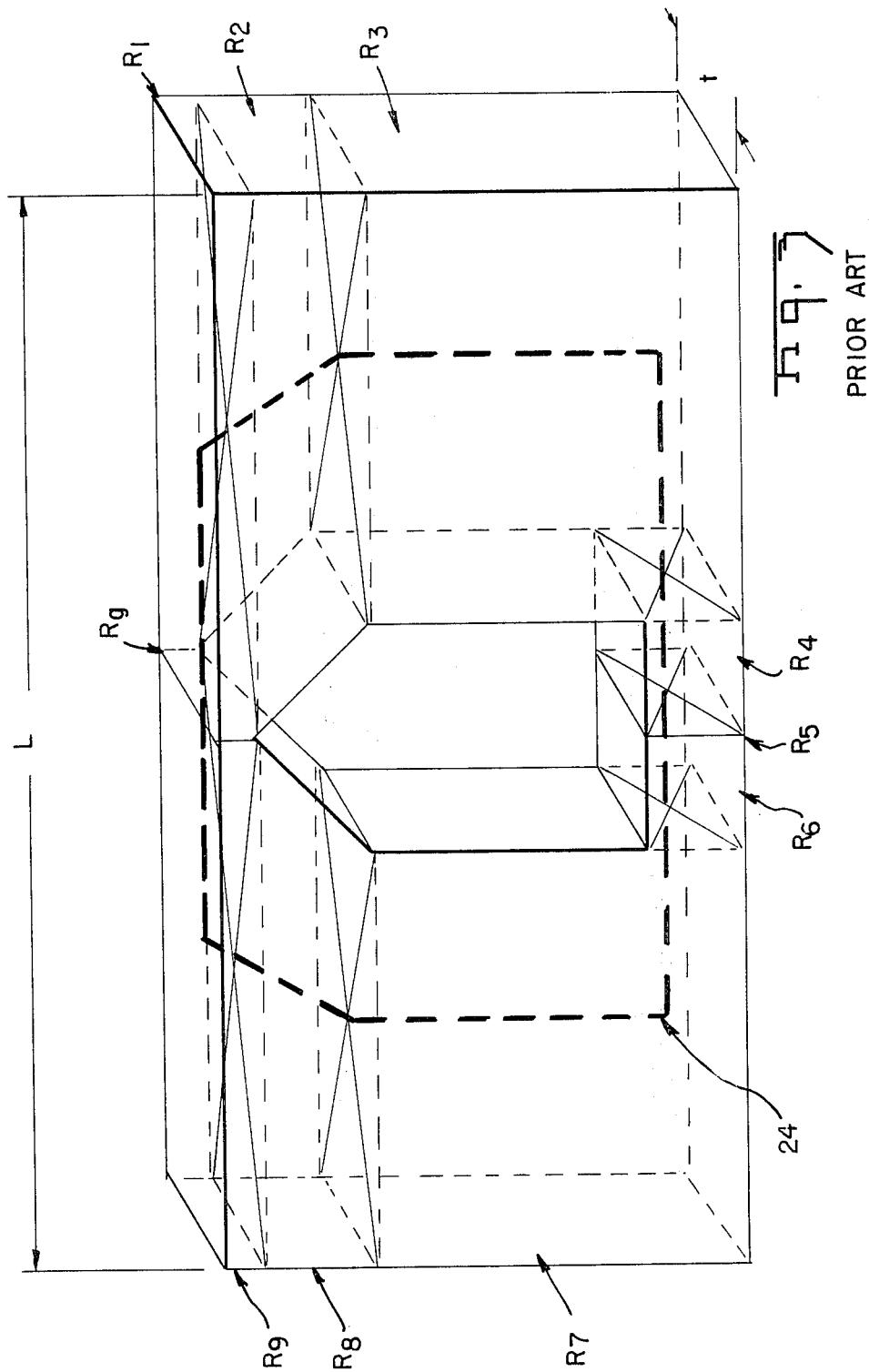

FIG. 2 shows the segments of the T-shaped core which make up the reluctance path. These segments are designated $R_1, R_2, \ldots R_9$ and the gap impedance is designated $R_g$. The mean length of the reluctance path is shown by the dashed line 23. FIG. 3 shows a similar analysis for a conventional rectangular core with the mean length of the reluctance path being shown by the dashed line 24. For the same length L and width t, the T-shaped core of the present invention provides a shorter mean reluctance path. By beveling the top, the cross-section area is increased without increasing the width of the surface which engages the recording track. The combination of the T-shape and the beveled edges at the recording medium interface increases the efficiency of the core and produces a higher output voltage.

Figure 4:
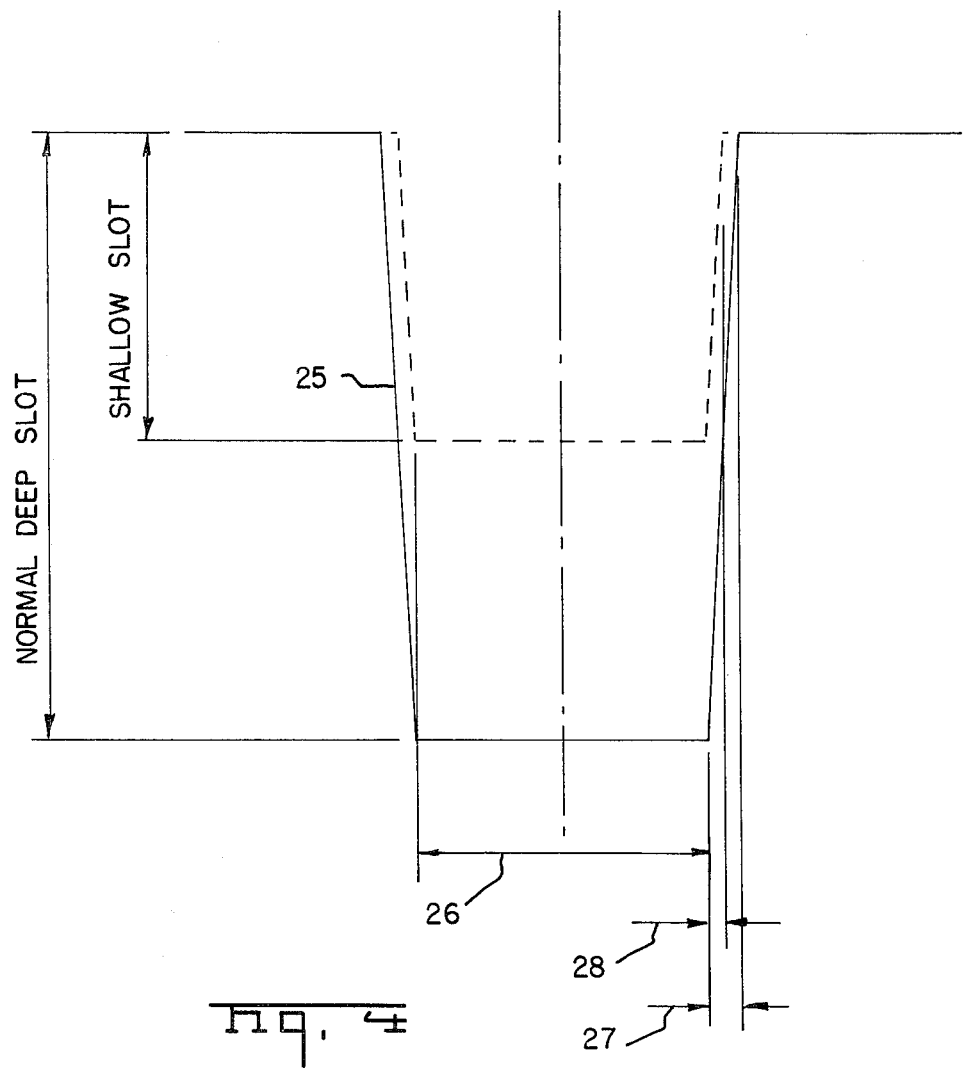
FIG. 4 shows the improved core location accuracy achieved with the shallow positioning slot in the body.
Figure 7:
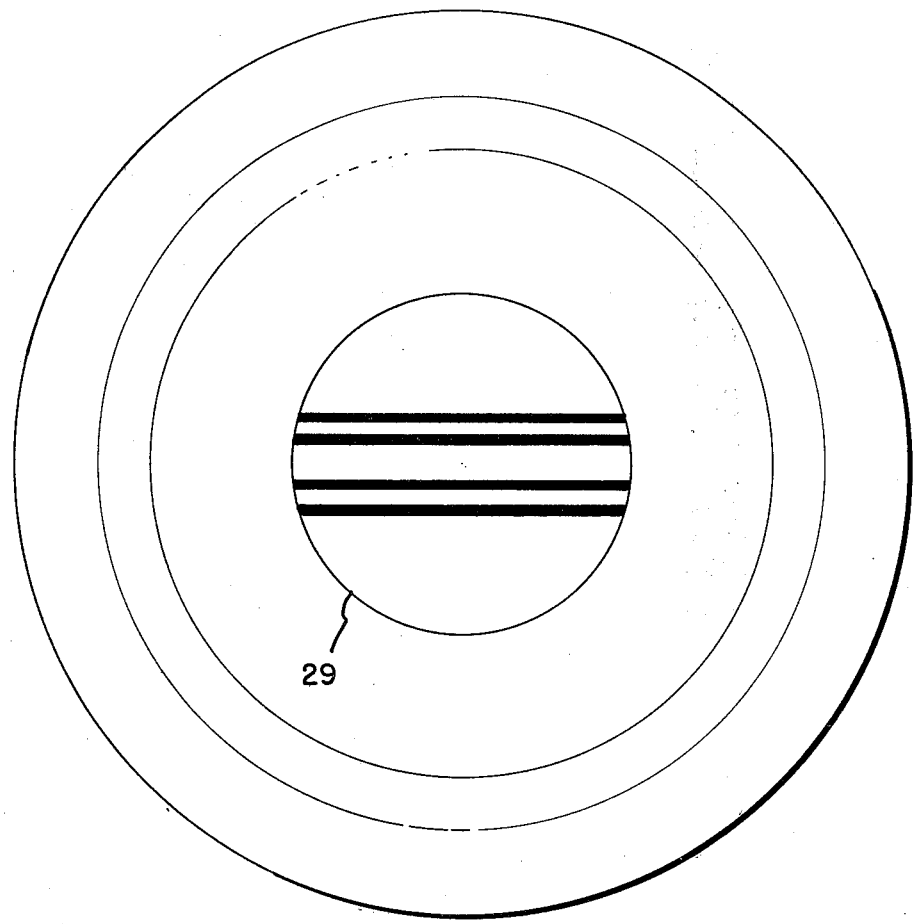

The T-shaped ferrite core also allows better location accuracy when it is assembled to the body 18. As shown in FIG. 4, when a deep slot in a ceramic material is made, the sides of the slot are tapered as at 25. The core will seat into the slot properly only if the width 26 of the slot is larger than the thickness of the core. However, the wider dimension at the top of the slot allows the core to tilt, resulting in very inaccurate core location. The problem is minimized by reducing the depth of the slot. FIG. 4 shows the reduced depth slot in dashed lines. The normal wide clearance of the deeper slot is designated 27 whereas the reduced clearance of the shallower slot is denoted 28.

The reduced slot depth also reduces the amount of sawing which must be performed on the body. This increases the life of the saw blade. Since these saw blades are quite expensive, this is an important consideration.

As previously mentioned, the beveled edges of the magnetic core provide an important cost reduction and improve performance because they minimize edge chipping and edge wear and reduce the breakage risk while still allowing a very narrow recording surface width. Manufacturing assembly time is reduced because extra care is not required to handle a very fragile part. The beveled edges also provide the required air slots next to the center rail without requiring an extra slotting operation which would add to fabrication cost.

The magnetic head assembly of the present invention is shown in FIG. 5 formed into a circular button 29. The alternate light and dark bands across the button are the five rails and slots of the penta rail head with the center rail being the surface 12 in FIG. 1 and the other four rails being formed by the surfaces of the body 18.

While a particular embodiment of the invention has been shown and described, various modifications are within the true spirit and scope of the invention. The appended claims are, therefore, intended to cover all such modifications.

What is claimed is:

1. A core for a magnetic head assembly comprising:
   a T-shaped ferrite member having an aperture for receiving a transducing coil and a beveled edge along the top of the T for disposition adjacent to a magnetic recording medium.

2. The core recited in claim 1 further comprising a magnetic gap across said beveled edge.

3. The core recited in claim 2 wherein said T-shaped ferrite member comprises two pieces which abut each other along the vertical of the T, the abutment of said pieces across said beveled edge forming said magnetic gap.

4. A magnetic head assembly comprising:
   a T-shaped ferrite member having an aperture for receiving a transducing coil and a beveled edge along the top of the T for disposition adjacent to a magnetic recording medium;
   a ceramic body having a first slot in which the arms of said T-shaped member are disposed and a cross-slot which is deeper than said first slot, the vertical portion of said T-shaped ferrite member being disposed in said cross slot, said cross-slot and said aperture providing a path for winding a coil on said assembly.

5. The assembly recited in claim 4 further comprising a magnetic gap across said beveled edge.

6. The assembly recited in claim 5 wherein said T-shaped ferrite member comprises two pieces which abut each other along the vertical of the T, the abutment of said pieces across said beveled edge forming said magnetic gap.

7. The assembly recited in claim 4 wherein the faces of said body on both sides of said first slot form slider rails which develop an air bearing when said assembly engages a rotating magnetic medium.

8. The assembly recited in claim 7 further comprising third and fourth slots parallel to and on opposite sides of said first slot in said slider, the faces of said body and the beveled edge of said T-shaped member forming a penta rail assembly.

9. The assembly recited in claim 1 formed into a circular button.

* * * * *